Oct. 31, 1933.  B. N. WALLIS  1,933,197
ADJUSTABLE SEAT
Filed March 16, 1933  6 Sheets-Sheet 1

Oct. 31, 1933.                B. N. WALLIS              1,933,197
                             ADJUSTABLE SEAT
                          Filed March 16, 1933        6 Sheets-Sheet 2

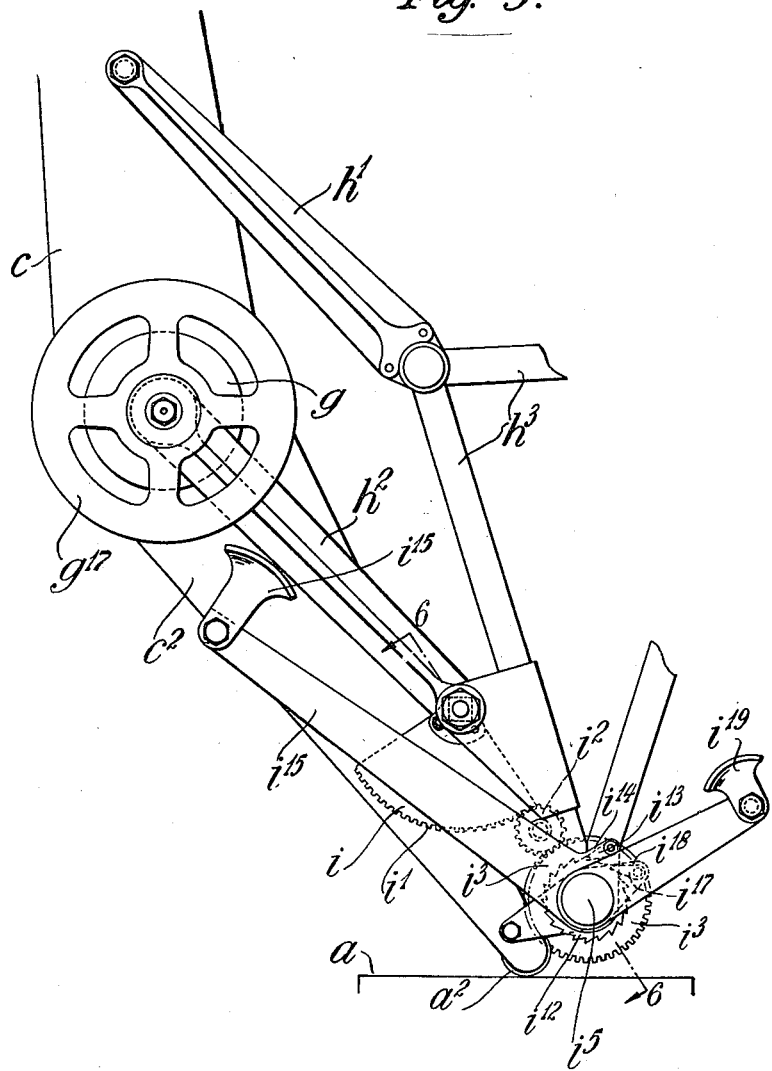

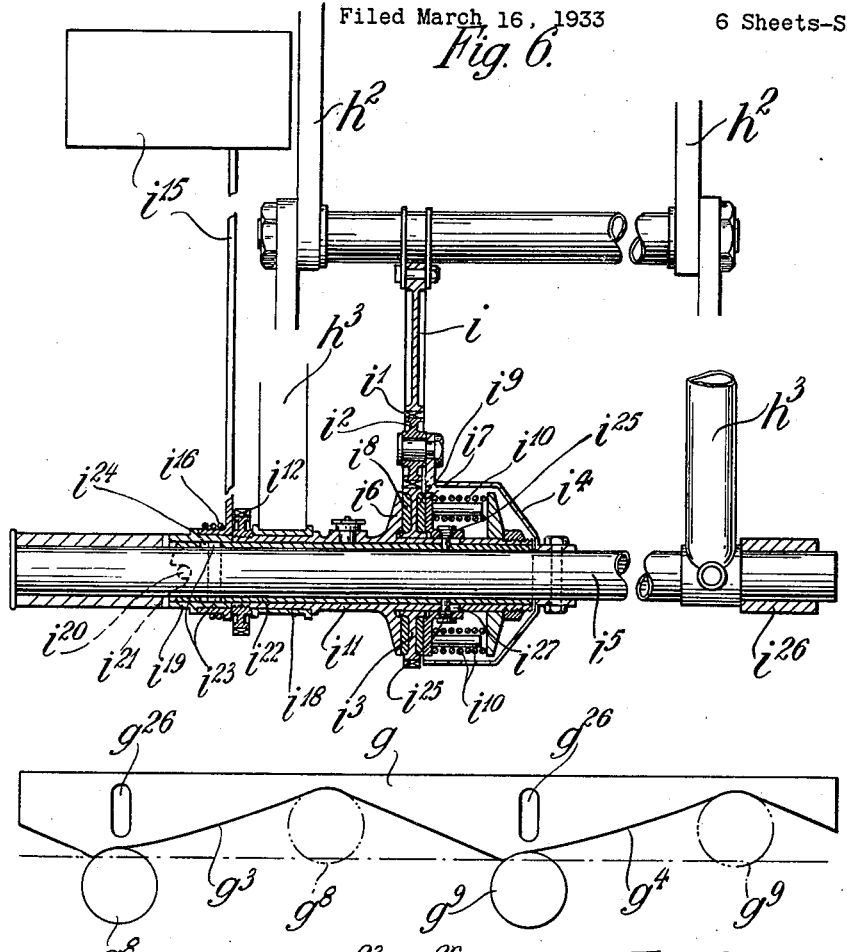

Patented Oct. 31, 1933

1,933,197

UNITED STATES PATENT OFFICE 1,933,197

ADJUSTABLE SEAT

Barnes Neville Wallis, Weybridge, Surrey, England, assignor to Vickers-Armstrongs Limited, Westminster, England Application March 16, 1933, Serial No. 661,162, and in Great Britain September 9, 1932

12 Claims. (Cl. 89—40)

This invention relates to adjustable seats, particularly suitable for use in aircraft. The invention will be described with reference to gun mountings for use in aircraft to which said seats are especially applicable, but the invention is also applicable to the pilot's seat or to other seats used in aircraft.

In adjustable seats for use on aircraft and particularly aircraft gun mountings, it is desirable that the seat is so arranged as to provide a uniform and easy motion in order to avoid jerks; that it is unaffected by changes in position of the aircraft in space; that it is compact in form and capable in one of its positions of leaving a maximum amount of clear space within the cockpit, and that the seat is so mounted on the bracket and is capable of training adjustment within the cockpit as to enable the gunner to accommodate said seat to the changes in position of his body when following the movements of the gun as this is being trained on a moving target. Although these qualities are especially desirable in gun mountings for aircraft, they are also advantageous in seats to be applied to other uses. The purpose of the present invention is to achieve these desiderata by providing a seat which is so mounted on the bracket or other seat support that it can be easily, quickly and uniformly adjusted by its occupant while remaining seated and while continuing to train, aim and fire the gun, or while carrying out any other duties.

According to this invention the adjustable seat comprises the combination of, an arm pivotally mounted at one of its ends on a support and pivotally connected at its other end to the seat, said arm being adapted by its angular adjustment to permit raising and lowering of the seat, a spring resister acting on said arm to apply a torque which gives a uniform counterbalancing effect to the seat in all of its positions and means for retaining said seat in any adjusted position.

Means is preferably provided for adjusting the spring resister to suit the weight of the occupant of the seat.

With an adjustable seat according to this invention, the means for raising the seat and for releasing the retaining means much be so positioned that they are operable by the occupant at any position to which the seat may be adjusted. If, however, said means are mounted on the bracket, difficulties occur which have been overcome by mounting the seat, according to this invention, on two pairs of arms extending outwardly from the bracket on which they are pivotally mounted and connecting said arms at their outer ends by a link—forming a parallel linkage mechanism for carrying the seat—and interposing between one of said arms and said link, mechanism for effecting relative angular adjustment of said arms and link, which acts to raise the seat. This raising mechanism also acts to retain the seat in any adjusted position. Further, this raising mechanism includes a clutch having a disengaging device by which it can be released to allow the seat to descend.

The invention will now be described with reference to the example of construction showing the adjustable seat as applied to a gun mounting, illustrated in the accompanying drawings, in which:—

Fig. 1 is a longitudinal section through a part of the fuselage of an aeroplane, illustrating the gun mounting, showing the bracket, lower bearing supports and the track for controlling the upper end of the bracket, the gun carried by said mounting being withdrawn into the fuselage, and the adjustable seat being shown in a position suitable for carrying out observations or other duties.

Fig. 2 is a cross-section through the fuselage illustrating the gun mounting, showing the bracket, lower bearing supports and the track, the arm carrying the gun on said bracket being shown in one of its firing positions, in which the gun has a range of fire indicated by the extreme positions of the gun shown in dotted lines and chain dotted lines, and the adjustable seat being shown in its lower position suitable for aiming, training and firing the gun between said positions.

Fig. 5 is a side elevation illustrating, on an enlarged scale, the mechanism for raising the seat and for retaining it in any adjusted position, and the means for releasing said retaining means.

Fig. 6 is a section on the line 6—6 in Fig. 5.

Fig. 7 is a development of the cam forming part of the spring resister for balancing part of the occupant's weight.

Fig. 8 is a section on the line 8—8 in Fig. 4, drawn to an enlarged scale.

Figure 1:
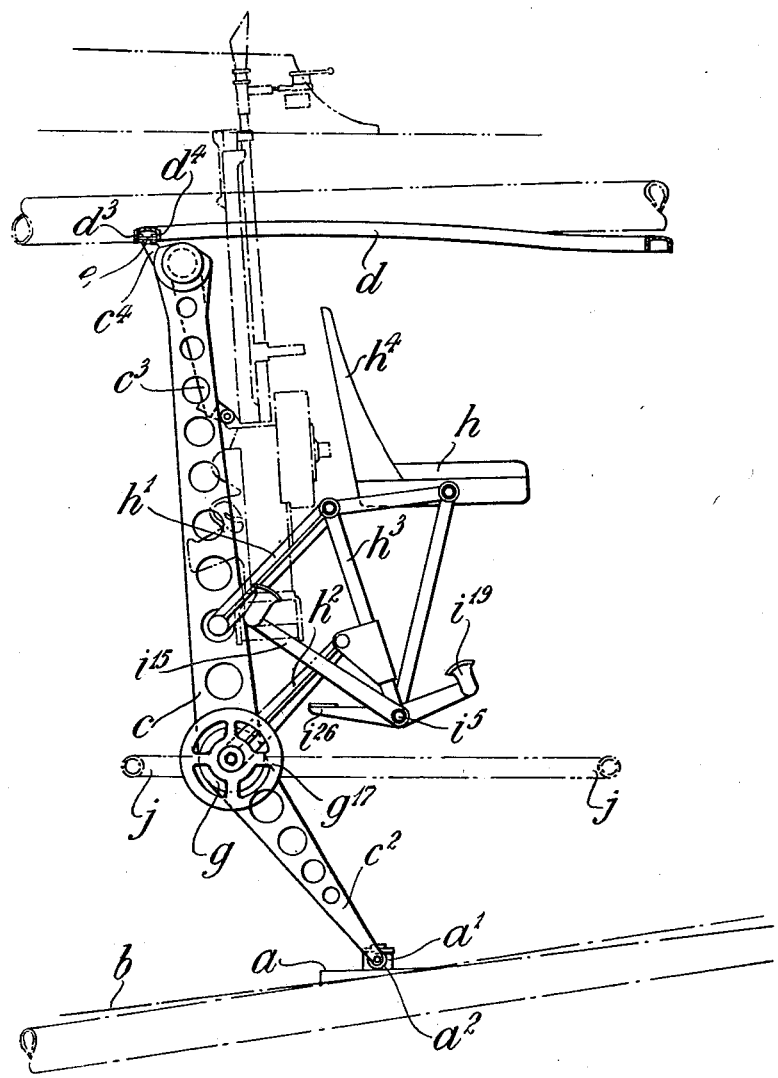
Figure 2:
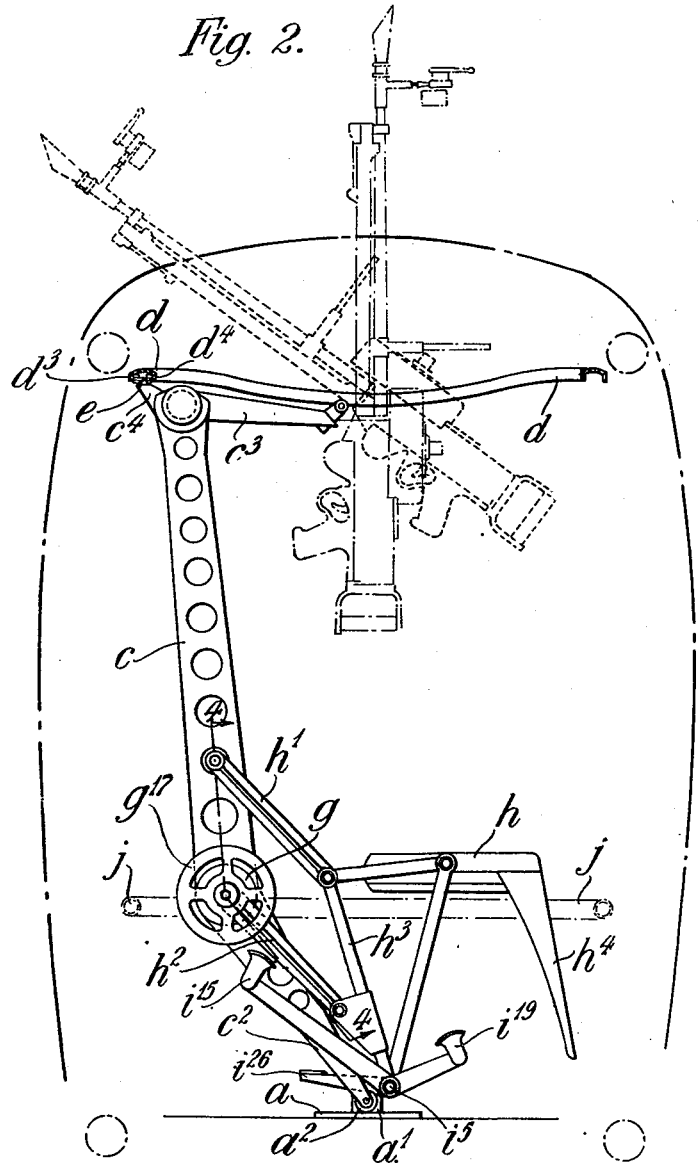
Figure 3:
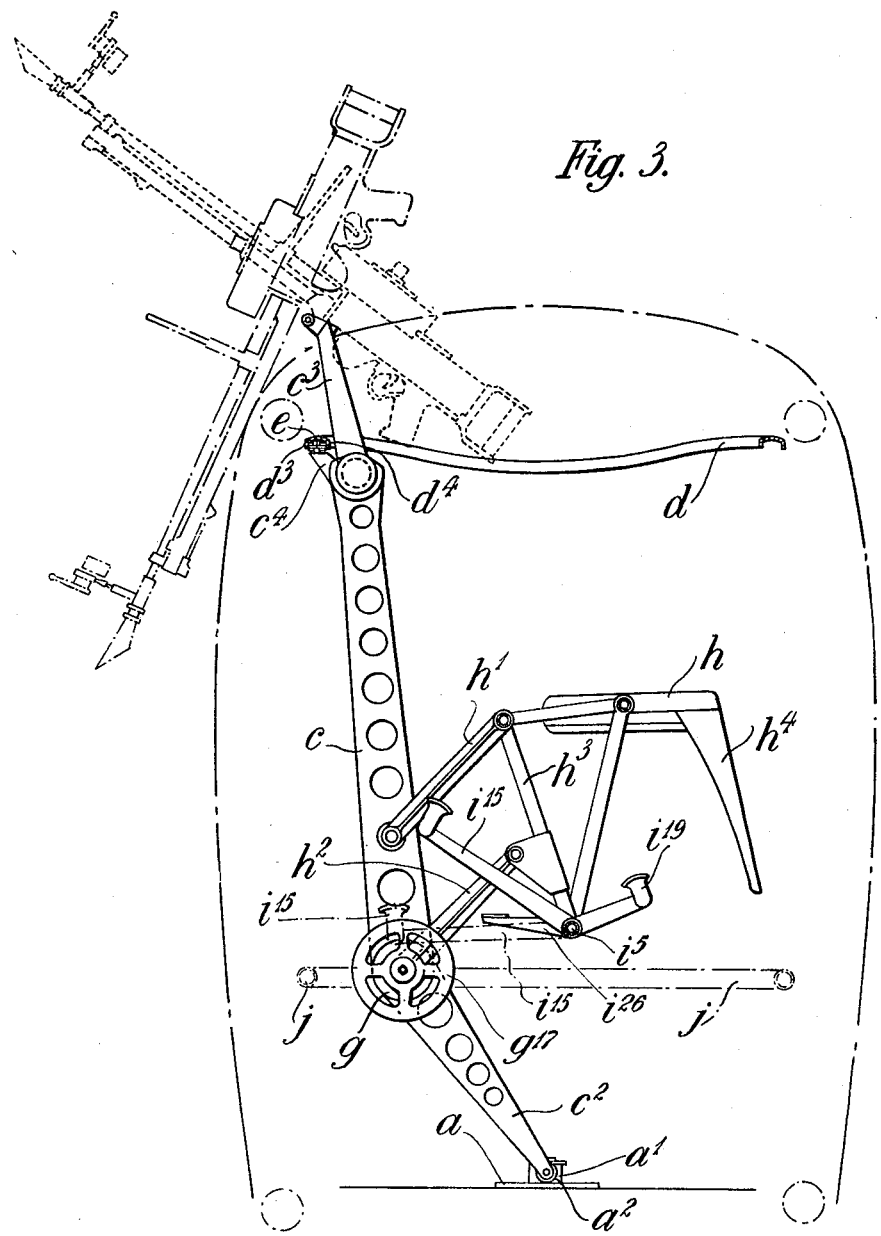
Fig. 3 is a similar view of the same construction as that shown in Fig. 2 but showing the arm carrying the gun in another of its firing positions, in which the gun has a range of fire indicated by the extreme positions of the gun shown in dotted and chain dotted lines, and the adjustable seat in its higher position suitable for aiming, training and firing the gun between said positions.

In the construction illustrated, the seat is shown applied to a gun mounting which comprises an annular bearing surface $a$ securely attached to the floor $b$ of the cockpit, to which is also fixed an upstanding pivot $a^1$ carrying ball bearings $a^2$, which ball bearings are mounted to run on said annular bearing surface $a$. The ball bearings support the bifurcated lower ends $c^1$ and $c^2$ of the bracket $c$, which bracket is thus provided with bearing supports on which the bracket is capable of rotation about the fixed axis of the pivot $a^1$ and on which the bracket is also angularly adjustable about the transverse axis of said bearings $a^2$, so as to permit of the necessary change in the angle of the bracket when moving around a non-circular track. As shown in Figs. 1, 2 and 3, the bracket $c$ extends upwardly in an inclined position to a point adjacent the opening in the cockpit where it is provided with a single bearing support, to be hereinafter described, which engages with the track $d$. The track $d$ is of channel cross-section having its flanges depending downwardly into the cockpit.

The bracket $c$ is provided at its upper end with a balancing arm $c^3$ carrying at its end the gun.

The single bearing support at the upper end of the bracket comprises a bridge piece $c^4$ fixed to the bracket and extending outwardly at an angle thereto and carrying a ball bearing $e$ which fits closely within the depending flanges $d^3$, $d^4$ of the track having a clearance of a few thousandths of an inch sufficient to enable this to run smoothly around the track. A self-applied brake (not shown) is mounted on the ball bearing $e$ for holding the bracket in any adjusted position.

Figure 4:
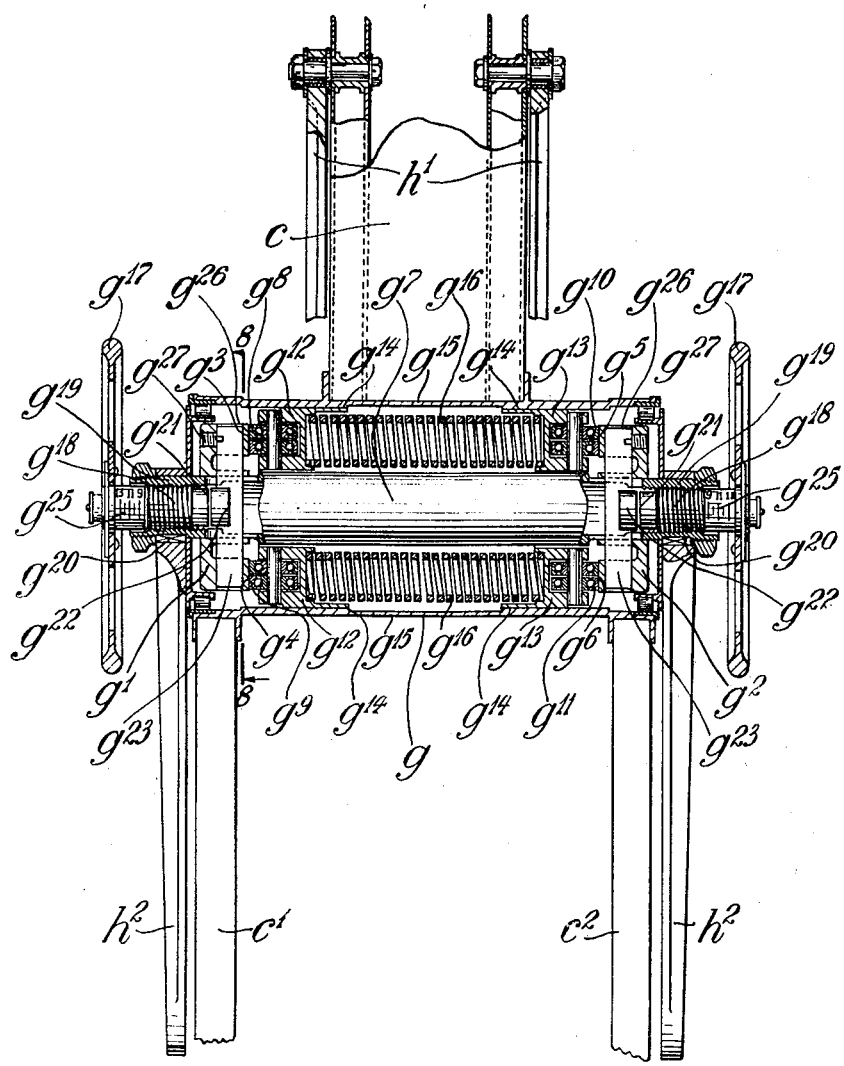
Fig. 4 is a cross-section through the bracket on the line 4—4 in Fig. 2, drawn to an enlarged scale.

The bracket is provided with upper and lower arms $h^1$, $h^2$ which are pivoted at one of their ends to the bracket for angular adjustment and are interconnected at their other end by a triangular frame $h^3$ forming a link between the ends of said arms and carrying the seat $h$. The lower arms $h^2$ are pivotally connected to the bracket through a spring resister $g$, the spring resister being shown more clearly in Fig. 4 and comprising opposed cams $g^1$, $g^2$ having duplicate cam tracks $g^3$, $g^4$ on the cam $g^1$ and $g^5$, $g^6$ on the cam $g^2$, which cam tracks are concentrically arranged around the axis of an inner member $g^7$ connecting said arms. Duplicate rollers $g^8$, $g^9$ and $g^{10}$, $g^{11}$ bearing at diametrically opposite but corresponding points on said cam tracks are carried by pistons $g^{12}$, $g^{13}$ which are mounted on the feathers $g^{14}$ so as to slide axially, but without rotation, with respect to an outer member $g^{15}$ fixed to the bracket, between which pistons, springs $g^{16}$ are arranged which act to press said rollers outwardly against the cams fixed to said arms.

The outward pressure of the springs $g^{16}$ acts to cause the rollers to tend to move down the cam tracks $g^3$, $g^4$, $g^5$, $g^6$ which reacts on the cams and causes these to impart to the arms $h^2$ a torque which, in the construction illustrated, is arranged to balance a part and preferably the greater part of the weight of the occupant of the seat. The form of each of the cam tracks $g^3$, $g^4$, $g^5$, $g^6$ is designed, as shown in Fig. 7, with a curvature which will cause the torque conveyed to the arms $h^2$ by the springs $g^{16}$ to be proportional to the moment of the load supported by the arms $h^2$ at any position to which said arms can be adjusted, so as thereby to counterbalance the greater part of the weight of the occupant irrespective of the change in moment of said load due to the angular adjustment of the arms. In order to make provision for persons of different weight, the cams $g^1$, $g^2$ are fixed to the arms by an adjustment device comprising a hand wheel $g^{17}$ having a screw $g^{18}$ which screws into the sleeve $g^{19}$ fixed by the key $g^{20}$ on each arm, the end $g^{21}$ of said screw bearing against a bearing piece $g^{22}$ fixed by the cotters $g^{23}$ to said cams which are mounted on feathers $g^{24}$ (Fig. 8) on said sleeve, so as to be capable of sliding axially, but without rotation, relatively to said sleeve. The cotters fit in slots $g^{26}$ in the cams and are secured to the cams by the set screws $g^{27}$. This adjustment device permits of the axial adjustment of the cams $g^1$, $g^2$ and thus allows the initial compression of the springs $g^{16}$ to be varied. Preferably, as shown, two of such adjustment devices are provided, one for each cam. The sleeves $g^{19}$ form part of and are fixed at their inner ends to the inner member $g^7$ while the outer ends of these sleeves serve as a datum point co-operating with graduations $g^{25}$ marked on the screw $g^{18}$ to indicate when the required adjustment has been effected.

The arm $h^2$ has fixed on its outer end a quadrant $i$ having teeth $i^1$ meshing with an idle pinion $i^2$ which in turn meshes with a spur wheel $i^3$. The idle pinion $i^2$ and spur wheel $i^3$ are carried on a bracket $i^4$ and shaft $i^5$ fixed to the lower end of the seat frame $h^3$. As shown in Fig. 6, the spur wheel $i^3$ incorporates a friction clutch comprising the opposed flanges $i^6$, $i^7$, carrying friction surfaces $i^8$, $i^9$, one of which flanges $i^7$ and its friction surface are pressed against the spur wheel which in turn is pressed against the other friction surface by the springs $i^{10}$. The flanges $i^6$, $i^7$ are carried on a hollow shaft $i^{11}$ to the end of which is fixed a ratchet wheel $i^{12}$ (Figs. 5 and 6) engaged by a pawl $i^{13}$ mounted on a projection $i^{14}$ of a toe pedal $i^{15}$ mounted on the shaft $i^5$, which toe pedal, when depressed, turns the ratchet wheel $i^{12}$ through a predetermined angle of adjustment, said pedal being movable from the position shown in full lines to the position shown in chain dotted lines in Fig. 3 and being returned by a spring $i^{16}$ while the ratchet wheel is held in its adjusted position by means of a fixed pawl $i^{17}$ mounted on the bearing $i^{18}$. The turning of the ratchet wheel $i^{12}$ rotates the spur wheel and idle pinion which reacts on the toothed quadrant $i$ to cause angular adjustment of the seat frame $h^3$ relatively to the arm $h^2$, and due to the parallel linkage construction of the arms $h^1$, $h^2$ and the seat frame $h^3$, this causes the arms $h^1$, $h^2$ to be raised. Moreover, this mechanism acts to retain the arms in any position to which they may be adjusted.

A heel pedal $i^{19}$ is also mounted on the shaft $i^5$ and is adapted to be actuated by the same foot as that which actuates the toe pedal, said heel pedal carrying a pin $i^{20}$ which engages with a surface cam $i^{21}$ formed on the end of a sleeve $i^{22}$ mounted between the shaft $i^5$ and the driving shaft $i^{11}$. This sleeve $i^{22}$, which is permitted to slide axially but is prevented from rotation on the shaft $i^5$ by means of the cross pin $i^{23}$ fixed to said shaft and engaging in the elongated slots $i^{24}$ in the sleeve, is connected by means of studs $i^{25}$ with the flange $i^7$ of the friction clutch, so that on depression of the heel pedal $i^{19}$ the sleeve $i^{22}$ and flange $i^7$ are moved axially to the right in Fig. 6 against the action of the springs $i^{10}$ to disengage the friction clutch and so allow the spur wheel $i^3$ and idle pinion $i^2$ to rotate and thus permit the seat to descend under the weight of occupant acting against the spring resister. The studs $i^{25}$ pass through elongated slots $i^{27}$ in the shaft $i^{11}$, so that this shaft and the flange $i^6$ are unaffected by the axial sliding movements of the sleeve $i^{22}$.

Said toe pedal $i^{15}$ and heel pedal $i^{19}$ are adapted to be operated by the left foot and on the opposite end of the shaft $i^5$ to that carrying the toe pedal $i^{15}$ and heel pedal $i^{19}$, a brake pedal $i^{26}$ is mounted and adapted to be operated by the right foot for releasing the self-applied brake when it is desired to adjust the orientation of the bracket, by the gunner bearing with his left foot against a rail $j$ extending around the cockpit.

The seat $h$ is reversibly mounted on the seat frame $h^3$ and this seat is provided with a back rest $h^4$ which can be used by the gunner when the seat is turned into the position shown in Fig. 1, where it serves for seating the gunner while carrying out observations or other duties. When, however, the seat is to be used while carrying out gunnery duties, the seat is reversed so that the back rest depends downwardly into the position shown in Figs. 2 and 3.

What I claim as my invention and desire to secure by Letters Patent is:—

1. An adjustable seat comprising, in combination, a support for the seat, a pair of arms pivotally mounted at one of their ends on said support, said arms being adapted by their angular adjustment to permit raising and lowering of the seat, a link connecting the other ends of said arms and carrying the seat, a spring resister acting on one of said arms to apply a torque which gives a uniform counter-balancing effect to the seat in all of its positions, means between one of said arms and said link for effecting relative angular adjustment thereof in order to raise said seat to and retain it in any adjusted position and means for releasing said retaining means in order to allow the seat to descend under the weight of the occupant acting against the spring resister.

2. An adjustable seat comprising, in combination, a support for the seat, an arm pivotally mounted at one of its ends on said support and pivotally connected at its other end to the seat, said arm being adapted by its angular adjustment to permit raising and lowering of the seat, a plurality of members relatively rotatable about a common axis, one of said members being fixed to said arm and the other being fixed to said support, opposed cams, rollers bearing on said cams, said cams and rollers being mounted on means which causes them to rotate relatively to each other on adjustment of the arm but permits one of them to have axial sliding movement relative to the other, a spring mounted between the opposed cams and rollers, said spring, rollers and cams acting through said members to apply a torque which gives a uniform counter-balancing effect to the seat in all of its positions adapted to balance a part only of the weight of the occupant, means for raising said seat to and retaining it in any adjusted position and means for releasing said retaining means in order to allow the seat to descend under the weight of the occupant acting against the spring resister.

3. An adjustable seat comprising, in combination, a support for the seat, an arm pivotally mounted at one of its ends on said support and pivotally connected at its other end to the seat, said arm being adapted by its angular adjustment to permit raising and lowering of the seat, a plurality of members relatively rotatable about a common axis, one of said members being fixed to said arm and the other being fixed to said support, two pistons mounted for axial sliding movement, but without rotation, relative to one of said members, a spring located centrally in said members and interposed between said pistons, rollers on said pistons, cams carried by the other member forming tracks on which said rollers run, means for raising said seat to and retaining it in any adjusted position and means for releasing said retaining means in order to allow the seat to descend under the weight of the occupant acting against the said spring.

4. An adjustable seat comprising, in combination, a support for the seat, a pair of arms pivotally mounted at one of their ends on said support and pivotally connected at their other ends to the seat, said arms being adapted by their angular adjustment to permit raising and lowering of the seat, a plurality of members relatively rotatable about a common axis, one member being fixed to one of said arms and the other being fixed to said support, a spring in said members, two pistons disposed one at either end of said spring mounted for axial sliding movement, but without rotation, relative to one of said members, rollers carried by said pistons, opposed cams carried by the other member and forming tracks for said rollers, said cam at one end having its high point arranged in axial alignment with the high point of the cam at the opposite end and each cam being formed with more than one cam track concentrically arranged around said common axis with said rollers arranged to bear against corresponding points on each of said tracks, means for raising said seat to and retaining it in any adjusted position and means for releasing said retaining means in order to allow the seat to descend under the weight of the occupant acting against the said spring.

5. An adjustable seat comprising, in combination, a support for the seat, an arm pivotally mounted at one of its ends on said support and pivotally connected at its other end to the seat, said arm being adapted by its angular adjustment to permit raising and lowering of the seat, a spring, cams and cooperating followers at opposite ends of said spring, which cams and followers are so mounted on said arm and said support respectively as to be axially slidable relative to each other, but without rotation, relative to the member on which it is mounted, said cams being so curved as to cause the spring to apply a torque to said arm which gives a uniform counter-balancing effect to the seat in all of its positions, means for raising said seat to and retaining it in any adjusted position and means for releasing said retaining means in order to allow the seat to descend under the weight of the occupant acting against the said torque.

6. An adjustable seat comprising, in combination, a support for the seat, a pair of arms pivotally mounted at one of their ends on said support, seat carrying means pivotally connecting the other ends of said arms, a spring resister acting on one of said arms and means between one of said arms and said seat carrying means for effecting relative angular adjustment thereof in order to adjust the seat.

7. An adjustable seat comprising, in combination, a support for the seat, a pair of arms pivotally mounted at one of their ends on said support, seat carrying means pivotally connecting the other ends of said arms, a spring resister acting on one of said arms and mechanism between one of said arms and said seat carrying means for effecting relative angular adjustment thereof in order to adjust the seat, said mechanism including driven and driving gear members, a driving shaft, a clutch between said driving gear member and said driving shaft, a toe pedal for actuating said driving shaft and means for causing said pedal to drive the shaft when moved in one direction but to move relative to said shaft when moved in an opposite direction.

8. An adjustable seat comprising, in combination, a support for the seat, a pair of arms pivotally mounted at one of their ends on said support, seat carrying means pivotally connecting the other ends of said arms, a spring resister acting on one of said arms and mechanism between one of said arms and said seat carrying means for effecting relative angular adjustment thereof in order to adjust the seat, said mechanism including driven and driving members, a driving shaft, a clutch between said shaft and said driving member, a ratchet wheel on said shaft, an actuating pedal having a pawl engaging said ratchet wheel adapted to drive said shaft when moved in one direction but to move relative to said shaft in the opposite direction, a fixed pawl engaging said ratchet wheel for holding said shaft in any adjusted position and a clutch releasing pedal adapted to release the clutch in order to permit said driving member to rotate freely on said shaft.

9. An adjustable seat comprising, in combination, a support for the seat, a pair of arms pivotally mounted at one of their ends on said support and pivotally connected at their other ends to the seat, said arms being adapted by their angular adjustment to permit raising and lowering of the seat, two members relatively rotatable about a common axis, one being fixed to said support and the other to said arm, two sets of barrel cams mounted for axial sliding movement, but without rotation, relative to one of said members, cooperating followers mounted for axial sliding movement, but without rotation, relative to the other of said members, a spring interposed between said sets of barrel cams and followers, means for axially adjusting the two sets of barrel cams relative to each other and means for retaining the seat in any adjusted position.

10. An adjustable seat comprising, in combination, a support for the seat, an arm pivotally mounted at one of its ends on said support and pivotally connected at its other end to the seat, said arm being adapted by its angular adjustment to permit raising and lowering of the seat, a plurality of members relatively rotatable about a common axis, one being fixed to said support and the other to said arm, a spring located centrally in said members, two pistons mounted for axial sliding movement, but without rotation, relative to one of said members, rollers carried on said pistons, cams acting on said rollers and axially adjustable, but without rotation, relative to the other of said members, means for axially adjusting said cams and means for adjusting said seat to and retaining it in any adjusted position.

11. An adjustable seat comprising, in combination, a support for the seat, an arm pivotally mounted at one of its ends on said support and pivotally connected at its other end to the seat, said arm being adapted by its angular adjustment to permit raising and lowering of the seat, two members relatively rotatable about a common axis, one being fixed to said arm and the other to said support, a spring in said members, two pistons one at either side of said spring mounted for axial sliding movement, but without rotation, relative to one of said members, rollers carried on said pistons, two cams acting on said rollers mounted for axial sliding movement but without rotation relative to the other of said members two adjusting devices for axially adjusting said cams and means for adjusting said seat to and retaining it in any adjusted position.

12. The combination of a gun mounting bracket a pair of arms pivotally mounted at one of their ends on said bracket a seat carrying member pivotally interconnecting the other ends of said arms, a seat on said carrying member inner and outer barrel members mounted coaxially with each other and with the pivot at the end of one of said arms, one barrel member being fixed to the arm and the other being fixed to the bracket, opposed cams axially slidable but non-rotatable relative to the inner barrel member, rollers adapted to run on said cams, pistons carrying said rollers and axially slidable, but non-rotatable, relative to the outer barrel member, springs between said pistons, means for axially adjusting each of said cams, a shaft on the seat carrying member, gearing between said shaft and the end of one arm pivoted to the seat carrying member, pedal actuated means for driving said shaft and gearing in order to raise the seat, said pedal actuated means preventing reversal of said drive, a clutch in said gearing and means for releasing said clutch to permit lowering of the seat.

BARNES NEVILLE WALLIS.